J. W. ARNEY.
OCCUPANT PROPELLED VEHICLE.
APPLICATION FILED DEC. 8, 1917.
1,313,157.
Patented Aug. 12, 1919.
2 SHEETS—SHEET 1.
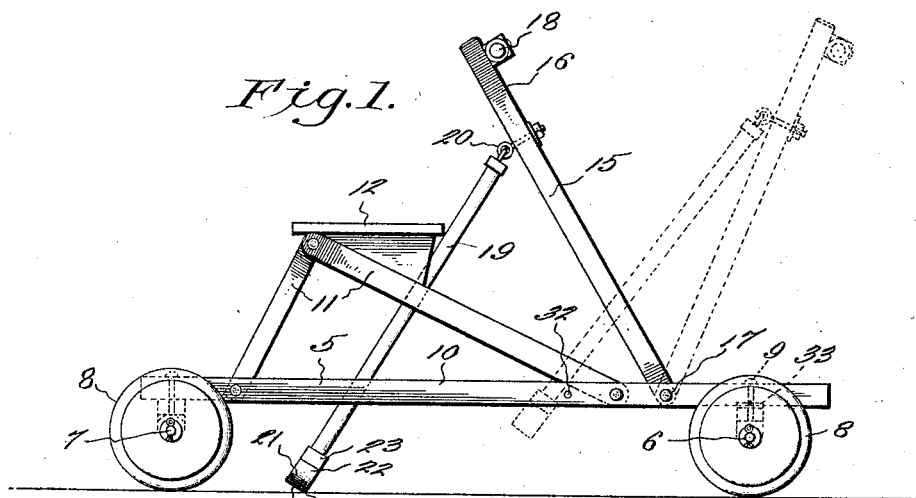
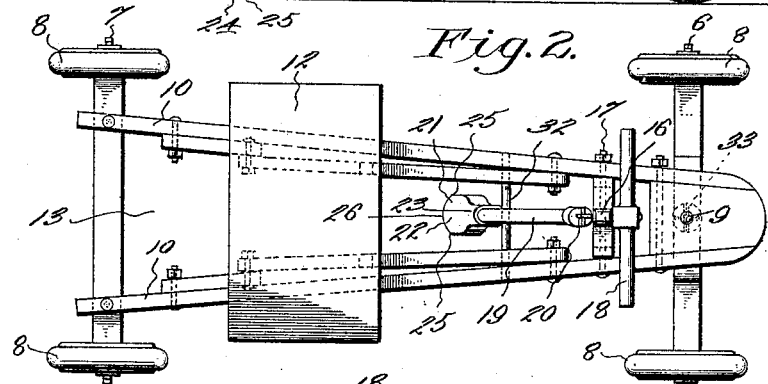
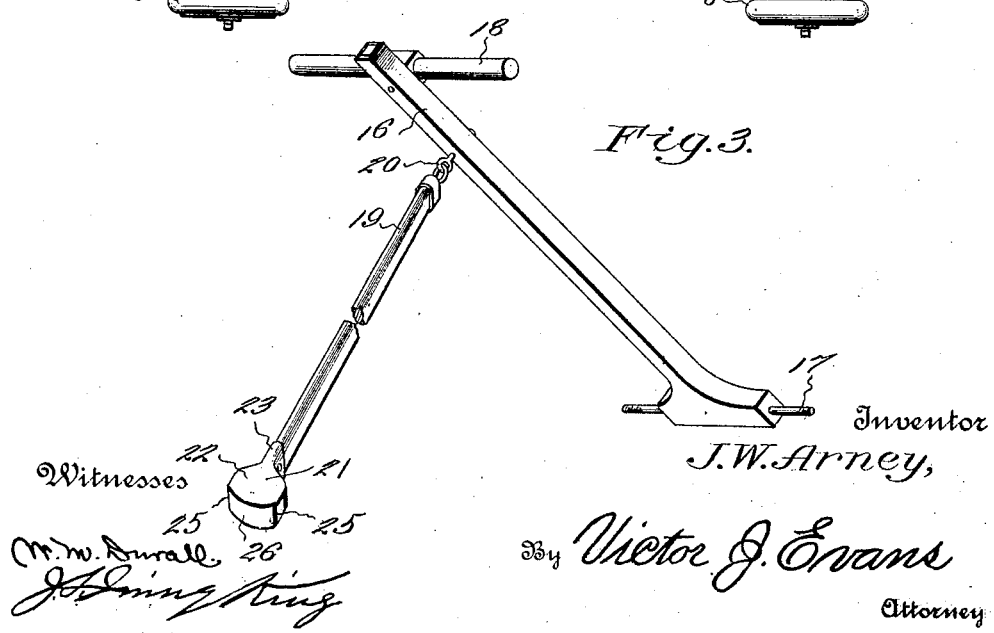
Inventor
J. W. Arney,
By Victor J. Evans
Attorney J. W. ARNEY.
OCCUPANT PROPELLED VEHICLE.
APPLICATION FILED DEC. 8, 1917.
1,313,157.
Patented Aug. 12, 1919.
2 SHEETS—SHEET 2.
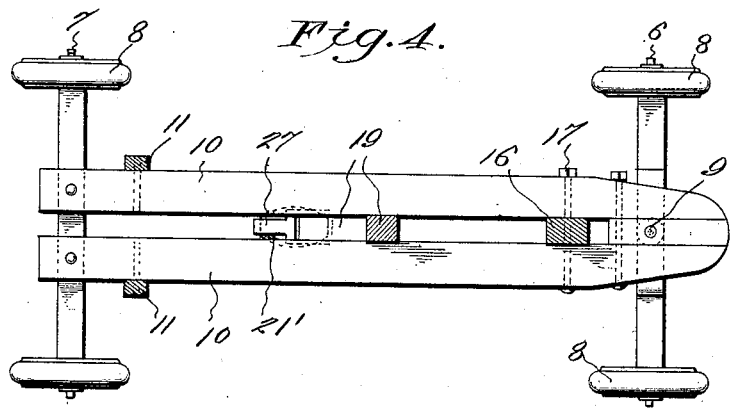
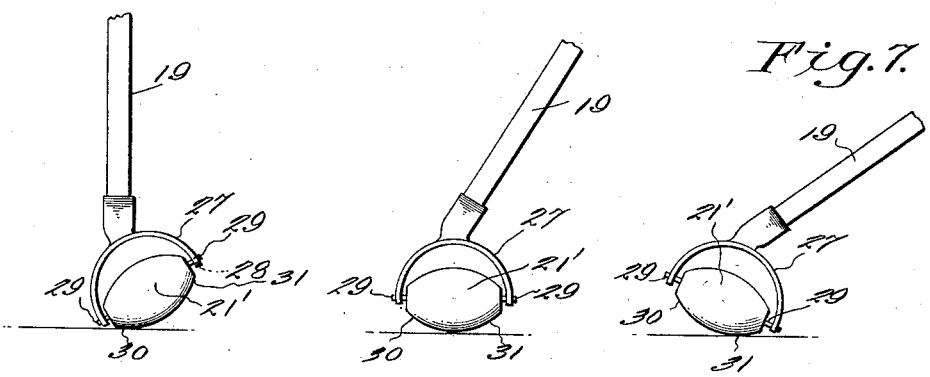
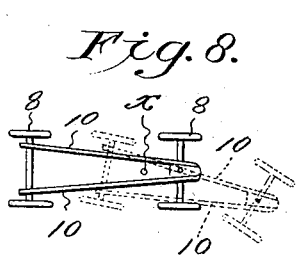
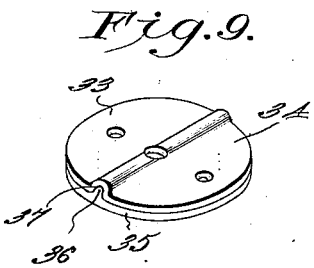
Witnesses
Inventor
J. W. Arney,
By Victor J. Evans
Attorney
THE COLUMBIA PLANOGRAPH CO., WASHINGTON, D. C.

UNITED STATES PATENT OFFICE.

JOHN WILLIAM ARNEY, OF TOMAHAWK, WISCONSIN, ASSIGNOR TO ALEXANDER B. LEITH, OF CHICAGO, ILLINOIS.

OCCUPANT-PROPELLED VEHICLE.

1,313,157.  Specification of Letters Patent.  Patented Aug. 12, 1919.

Application filed December 8, 1917. Serial No. 206,270.

*To all whom it may concern:*

Be it known that I, JOHN W. ARNEY, a citizen of the United States, residing at Tomahawk, in the county of Lincoln and State of Wisconsin, have invented new and useful Improvements in Occupant-Propelled Vehicles, of which the following is a specification.

This invention relates particularly to occupant propelled vehicles, designed primarily for the use of children.

The primary object is to provide a vehicle of simple and inexpensive construction which may be propelled with facility by the occupant, the propelling mechanism of the vehicle being gearless and of exceedingly simple construction.

A further object is to provide a vehicle of the character indicated, equipped with gearless propelling mechanism of such character that the vehicle can be readily turned or steered in any direction without such movement being impeded by the propelling mechanism, and in which, indeed, the turning movement is facilitated by the propelling mechanism.

The invention is illustrated in its preferred embodiment in the accompanying drawings, in which—
Figure 1 represents a side elevational view of a vehicle embodying the invention; Fig. 2, a plan view of the same; Fig. 3, a perspective view of the propelling mechanism; Fig. 4, a horizontal plan sectional view, illustrating a modification; Figs. 5, 6 and 7, detail views, showing the lower portion of a push-bar device employed in the modification shown in Fig. 4, these views illustrating the manner of contact of the revoluble shoe employed with the ground in various positions of the push bar; Fig. 8, a plan view, diagrammatic in character, illustrating the turning movement of the vehicle; and Fig. 9, a detailed view of the fifth-wheel construction employed.

Referring, first, to Figs. 1 to 3, inclusive, 5 denotes the vehicle body, mounted on the front axle 6 and a rear axle 7, the axles being equipped with rubber-tired wheels 8.
In the illustration given, the front axle is pivotally connected to the front portion of the body 5 by means of a king-bolt 9. The body 5 comprises a pair of spaced beams or bars 10, each equipped with seat-supporting bars 11, upon which is mounted the seat 12, the seat being disposed near the rear end of the body at a suitable elevation.

The spacing of the bars or frame-members 10 is preferably such as to provide a substantially triangular space or slot 13 between them, it being noted that the bars converge from the rear end of the vehicle to the front end. The purpose of spacing the substantially horizontal frame-members 10 in the manner described, thus providing the substantial space between them in the manner illustrated in Fig. 2, is to permit the facile installation of the propelling mechanism and freedom of operation through the central longitudinal space of the push-bar of the propelling mechanism, it being noted that it is desirable to have the push-bar assume varying inclinations in the central longitudinal plane in the ordinary straight-ahead propulsion of the vehicle, and to assume varying inclinations in a diagonal plane in the operation of turning or steering the vehicle.

The propelling mechanism preferably is of the exceedingly simple character illustrated in Fig. 3, comprising a hand-lever 15 consisting of a bar, 16, having its lower front end portion enlarged to occupy the space between the frame-members 10, some distance back of the front axle, the pivot portion being mounted on a bolt 17 which connects the members 10, and a transverse handle-bar 18 secured to the upper end portion of the member 16 and serving as a means for actuating the lever; and a push-bar 19, swiveled to the hand-lever 16, as indicated at 20, a short distance below the handle-bar 18. The swivel connection 20 is in the form of an eye which projects axially from the upper end of the bar 19, and an eye bolt connected therewith and extending through and secured to the bar 16. The lower end of the push-bar 19 is equipped with a shoe 21, which preferably is composed of friction material, such as rubber. This member comprises a body 22 having its upper end provided with a contracted socket 23 secured to the lower end of the push-bar. The body 22 forms an enlargement which extends transversely with respect to the lower end of the bar 19, and has a convex lower end surface, the ends of which are designated 25 and the median portion of which is designated 26.

In the use of the vehicle, the child seats himself on the seat 12 and places his feet on the front axle at opposite sides of the narrow front portion of the body of the vehicle. Then, the child grasps the handle-bar 18 and manipulates the hand-lever 15 in a forward and back motion. When the hand-lever is drawn rearwardly, the shoe of the push-bar engages the ground and propels the vehicle. When the child desires to turn the vehicle, he does so by steering it by means of his feet through the medium of the front axle; and by reason of the substantially universal connection at the point 20, the push-bar 19 is capable of assuming an inclined diagonal position, that is, a position in an inclined plane which intersects the longitudinal vertical central plane of the vehicle in which the hand-lever 15 operates. Thus, the propelling mechanism is capable of operating freely in making turns as well as when the machine is moving in a straight-ahead course. The construction not only permits the turning movement without the push-bar becoming caught or wedged, but the propelling mechanism will aid in the turning movement of the vehicle.

It will be noted from Fig. 1 that the lower corner of the rounded or convex lower end of the shoe engages the ground. In the straight-ahead movement of the machine, the intermediate portion engages the ground; and as the machine turns in one direction or the other, the shoe rocks on its rounded lower edge, so that one end portion or the other of the rounded lower edge engages the ground, depending upon the way the machine is turned.

The construction illustrated in Figs. 4 to 7, inclusive, is similar, except that the frame-members 10 are arranged in parallel relation and spaced a short distance apart. In this case, the push-bar 19 moves in the slot afforded between the members 10; and by reason of the restricted character of this slot, it is especially desirable to provide a form of shoe which will roll laterally upon the ground when the vehicle makes a turn. For this purpose the lower end of the bar 19 is equipped with a bracket or yoke 27 in which is mounted a revoluble shoe 21¹. This is accomplished by providing the end portions of the arms of the yoke 27 with alined perforations 28 which receive the axle-studs 29 of the shoe 21¹. Upon the turning or swerving of the vehicle, the shoe 21¹ will roll laterally upon the ground; and the propelling mechanism still may be actuated, owing to the oval form which is preferably given to the member 21¹. Thus, the member 21¹ may contact with the ground at an intermediate point as shown in Fig. 6, at the end point 30 as shown in Fig. 5, or at the other end point 31 as shown in Fig. 7, corresponding with various positions of inclination of the push-bar 19.

In Figs. 1 and 2, the frame-members 10 are shown connected back of the pivot 17 by a transverse rod or push-bar support 32, upon which the push-bar may be supported in the manner illustrated by the dotted lines in Fig. 1, when the propelling lever 15 is in the extreme forward position. This enables the push-bar to be held free from the ground in coasting, or in passing over obstructions. It may be added that in the ordinary operation of the machine, the universal connection of the push-bar with the hand-lever, in the illustration given in Figs. 1 and 2, enables the bar to move in any direction in case an obstruction is encountered, thus preventing injury to the machine and its occupant.

In Fig. 9, there is shown a fifth-wheel 33, through which the king bolt 9 extends. This fifth-wheel comprises a pair of disks 34 and 35, one of said disks being provided with a projection 36 which fits in sockets 37 of the other disk, preventing any accidental swerving or turning of the front axle when the vehicle is being propelled in the straight-line course. Obviously, when desiring to turn the vehicle, the operator by thrusting his foot against the front axle may readily disengage the projection 36 from the sockets 37.

The construction illustrated and described is of exceedingly simple character, and may be profitably marketed at a comparatively small price. The vehicle is especially useful for children, affording a pleasant form of recreation and healthful exercise. The form of construction illustrated in Figs. 1 to 3, inclusive, is especially desirable, as well as cheap to manufacture. The design of the body of the vehicle may be varied greatly, of course.

The foregoing detailed description has been given for clearness of understanding only and no unnecessary limitation should be understood therefrom, but the appended claims should be construed as broadly as permissible in view of the prior art.

What I regard as new and desire to secure by Letters Patent, is:—

1. An occupant propelled vehicle comprising a wheeled body capable of being steered, said body having a central longitudinal space, a hand-lever pivotally connected with the front portion of the body, and a push-bar having its upper end joined by universal connection with the hand-lever and having its lower end adapted to engage the ground and cause propulsion of the vehicle when the hand-lever is swung rearwardly.

2. An occupant propelled vehicle comprising a wheeled body capable of being steered, said body having a longitudinal central space, a hand-lever having its lower end portion pivotally mounted in said space near the front end of the body, said hand-lever adapted to swing in a central longitudinal vertical plane, and a push-bar working through said space and having its upper portion joined by an articulate connection to the hand-lever near its upper end and having its lower end equipped with a rounded friction member adapted to engage the ground and cause propulsion of the vehicle when the hand-lever is swung rearwardly.

3. An occupant propelled vehicle comprising a body provided with a central longitudinal space and equipped at its rear portion with a seat, a hand-lever having its lower end pivotally mounted in said body near the front end thereof, and a push-bar having universal connection at its upper end with the said hand-lever and having its lower end equipped with a rounded friction shoe adapted to engage the ground and cause propulsion of the vehicle when the hand-lever is swung rearwardly.

4. An occupant propelled vehicle comprising a pair of longitudinal frame-members spaced apart and provided with a central longitudinal space, a wheeled axle upon which the rear ends of said frame-members are mounted, a wheeled front axle having swivel connection with the front portion of said body, said front axle having its ends projecting at the sides of the body to afford foot rests, a hand-lever having its lower end disposed between said frame-members and pivotally connected therewith a short distance back of the front axle, and a push-bar working through said central space and having its upper end in articulate connection with said hand-lever and having its lower end equipped with a rounded friction shoe adapted to engage the ground and cause propulsion of the vehicle when the hand-lever is swung rearwardly.

5. An occupant propelled vehicle comprising a pair of longitudinal spaced frame-members which converge forwardly, a wheeled rear axle supporting the rear ends of said frame-members, a wheeled dirigible front support for said frame members, a hand-lever having its lower end pivotally connected with said frame-members near the front end of the body, and a push-bar having its upper end joined by universal connection to said hand-lever and having its lower end adapted to engage the ground and cause propulsion of the vehicle when the hand-lever is swung rearwardly.

6. An occupant propelled vehicle comprising a wheeled body adapted to be steered, said body provided with a central longitudinal space, a hand-lever pivotally connected with said body and adapted to swing in a central longitudinal vertical plane, a push-bar having articulate connection with said hand-lever at its upper end and having its lower end equipped with a shoe adapted to engage the ground, and a push-bar supporting member carried by said body and adapted to support the push-bar free from the ground when the hand-lever is swung to an extreme forward position.

7. An occupant propelled vehicle comprising a body, a propelling bar pivoted thereto, a pusher bar swiveled to the propelling bar, a friction shoe on the free end of the pusher bar to engage with the road surface, and means for limiting the lateral swinging of the pusher bar with respect to the body.

8. An occupant propelled vehicle comprising a wheeled body, a propelling bar pivoted thereto, a push bar swiveled to the propelling bar, and a shoe arranged on the free end of the push bar and disposed angularly with respect to the plane of movement of said propelling bar.

9. A vehicle including a body, occupant propelled mechanism pivotally associated with said body, and a shoe journaled to said propelling mechanism for rotation angularly with respect to the course of travel of the vehicle.

10. A vehicle including a body, a propelling bar pivoted thereto, a push bar swiveled to the propelling bar, and a shoe journaled in the lower end of the push bar for movements at right angles with respect to the point of articulation of the said propelling bar and push bar.

In testimony whereof I affix my signature.

JOHN WILLIAM ARNEY.